United States Patent
Byrd et al.

(10) Patent No.: US 10,984,457 B2
(45) Date of Patent: Apr. 20, 2021

(54) TRUSTED STATEMENT VERIFICATION FOR DATA PRIVACY

(75) Inventors: Gregory T. Byrd, Raleigh, NC (US); Michael G. McIntosh, Clifton, NJ (US); Nataraj Nagaratnam, Morrisville, NC (US); Anthony J. Nadalin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3243 days.

(21) Appl. No.: 11/849,210

(22) Filed: Aug. 31, 2007

(65) Prior Publication Data

US 2009/0063289 A1    Mar. 5, 2009

(51) Int. Cl.
*G06Q 10/00* (2012.01)
*G06Q 30/06* (2012.01)
(52) U.S. Cl.
CPC ......... *G06Q 30/06* (2013.01); *G06Q 30/0601* (2013.01)
(58) Field of Classification Search
CPC ............. G06Q 30/06; G06Q 30/0601
USPC ...................................... 705/1, 319
See application file for complete search history.

(56) References Cited

U.S. PATENT DOCUMENTS

| | | | |
|---|---|---|---|
| 2002/0169793 A1* | 11/2002 | Sweeney | 707/204 |
| 2003/0037233 A1* | 2/2003 | Pearson | 713/156 |
| 2003/0056113 A1* | 3/2003 | Korosec | 713/200 |
| 2005/0131762 A1* | 6/2005 | Bharat et al. | 705/14 |
| 2007/0261116 A1* | 11/2007 | Prafullchandra et al. | 726/22 |

* cited by examiner

*Primary Examiner* — Gabrielle A McCormick
(74) *Attorney, Agent, or Firm* — Christopher M. Pignato

(57) ABSTRACT

Embodiments of the present invention address deficiencies of the art in respect to privacy data management and provide a novel and non-obvious method, system and computer program product for trusted statement verification for data privacy. In one embodiment of the invention, a method for trusted statement verification for data privacy can be provided. The method can include deducing a claim from an attribute for personal data for an end user, receiving a request from a personal data consumer to vouch for an assertion based upon the attribute, comparing the assertion to the claim, and providing a voucher for the assertion to the personal data consumer on behalf of the end user if the claim supports the assertion without revealing the attribute to the personal data consumer.

13 Claims, 1 Drawing Sheet

TRUSTED STATEMENT VERIFICATION FOR DATA PRIVACY

BACKGROUND OF THE INVENTION

Field of the Invention

The present invention is related to the field of data privacy and identity management in a computer communications network, and more particularly to data parsimony in pseudonymous e-commerce transactions.

Description of the Related Art

Data privacy and identity management refers to the exercise of dominion and control over one's identity and personal data when engaging in computing transactions in a computer communications network. While always deemed to be important, in an age of Internet e-commerce, data privacy and identity management has moved to the forefront of the information technology community. Generally, data privacy and identity management ranges from the storage of personal data in a secure identity management and the limitation of the distribution of privacy data to complex creation, exchange and processing of certificates and credentials in an e-commerce transaction to preserve the confidentiality of the identity of an end user and associated end user data.

Anonymous credentialing is a form of data privacy and identity management that refers to the obscuring of an individual in a computing system through a trusted intermediary when interacting with computing entities in a computer communications network. The purpose of anonymous credentialing is to shield the individual from disclosing access and usage patterns from the computing entities when interacting with the computing entities. Use cases for anonymous credentialing including not only single-sign-on applications, but also e-commerce scenarios such as anonymous bidding in an auction environment. The identity mixer project from the Zurich Research Laboratory of International Business Machines Corporation represents one such form of anonymous credentialing.

Despite the general desirability to withhold private information in an e-commerce transaction, for many transaction types, the exchange of personal data is required. Examples include the submission of credit applications, the establishment of a brokerage account and the completion of online government documents. Many transactions in this regard require the presentation of personal data sufficient to establish a minimum age, a general location of residence, or the possession of minimum funds in a bank account. In consequence, end users can be compelled to share personal data despite a desire to preserve the privacy of personal data.

To address some of the concerns arising from the undesirable albeit required sharing of personal data, multi-lateral identity management systems have been proposed in which a trusted third party enjoys a trusted relationship with a first set of end users sharing personal data and second set of end users consuming the personal data of the first set of end users. In the multi-lateral identity management architecture, end users take comfort in the judgment of the trusted third party to only share personal information with trustworthy consumers. The trustworthy consumers, in turn, enjoy the security of relying upon the trusted third party vouching for the accuracy of shared personal data.

Despite the trustworthy nature of the intermediate third party in a multi-lateral arrangement, the third party still can only share the privacy data requested—no more, no less. Consequently, despite best intentions, the trusted third party can over-disclose confidential data where only an assertion supported by the confidential data is required. Specifically, where it must be known whether or not an end user is of majority age, it is not necessary to disclose a birth date for the end user, just a confirmation that indeed the end user is of majority age. Similarly, where it must be known whether or not an end user possesses a threshold amount of cash in a bank account, it is not necessary to disclose a bank balance for the bank account, just a confirmation that indeed the bank account has a sufficient bank balance to meet the required threshold.

BRIEF SUMMARY OF THE INVENTION

Embodiments of the present invention address deficiencies of the art in respect to data privacy and provide a novel and non-obvious method, system and computer program product for trusted statement verification for data privacy. In one embodiment of the invention, a method for trusted statement verification for data privacy can be provided. The method can include deducing a claim from an attribute for personal data for an end user, receiving a request from a personal data consumer to vouch for an assertion based upon the attribute, comparing the assertion to the claim, and providing a voucher for the assertion to the personal data consumer on behalf of the end user if the claim supports the assertion without revealing the attribute to the personal data consumer.

In one aspect of the embodiment, deducing a claim from an attribute for personal data for an end user can include manually mapping a claim to the attribute. In contrast, in another aspect of the embodiment, deducing a claim from an attribute for personal data for an end user can include automatically mapping a claim to the attribute according to a rule in a rule base. For instance, automatically mapping a claim to the attribute according to a rule in a rule base can include receiving the attribute from the end user over a computer communications network, and applying a rule to generate at least one claim from the attribute.

In another embodiment of the invention, an e-commerce data processing system can be configured for trusted statement verification. The system can include a voucher service configured for communications both with an end user and a personal data consumer over a computer communications network. The system further can include a mapping of attributes of personal data to claims for the personal data. Notably, the voucher service can include program code enabled to compare an assertion received from a personal data consumer to a claim in the mapping and to provide a voucher for the assertion to the personal data consumer on behalf of the end user if the claim supports the assertion without revealing the attribute to the personal data consumer.

In one aspect of the embodiment, an attribute-to-claims engine can be provided. The engine can include program code enabled to generate the mapping for the attributes by deducing at least one claim for the attributes according to at least one rule in a rule base. For example, the assertion can be a required bank account balance and the claim can be an available bank account balance in excess of a fixed amount. As another example, the assertion can be a required age and the claim can be an age range exceeding a fixed amount.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for trusted statement verification for data privacy. In accordance with an embodiment of the present invention, personal data attributes can be classified according to type and claimed assertions can be defined for evaluation against the classified attributes. Thereafter, the claimed assertions can be mapped to the classified attributes. Finally, requests for voucher can be received in connection with a publisher of attributes. The voucher requests can be compared to the claims mapped to the attributes to determine whether or not a voucher can be issued as requested without revealing the attributes. In this way, the confidentiality of the attributes can be maintained while satisfying the need to vouch for the publisher of the attributes.

Figure 1:
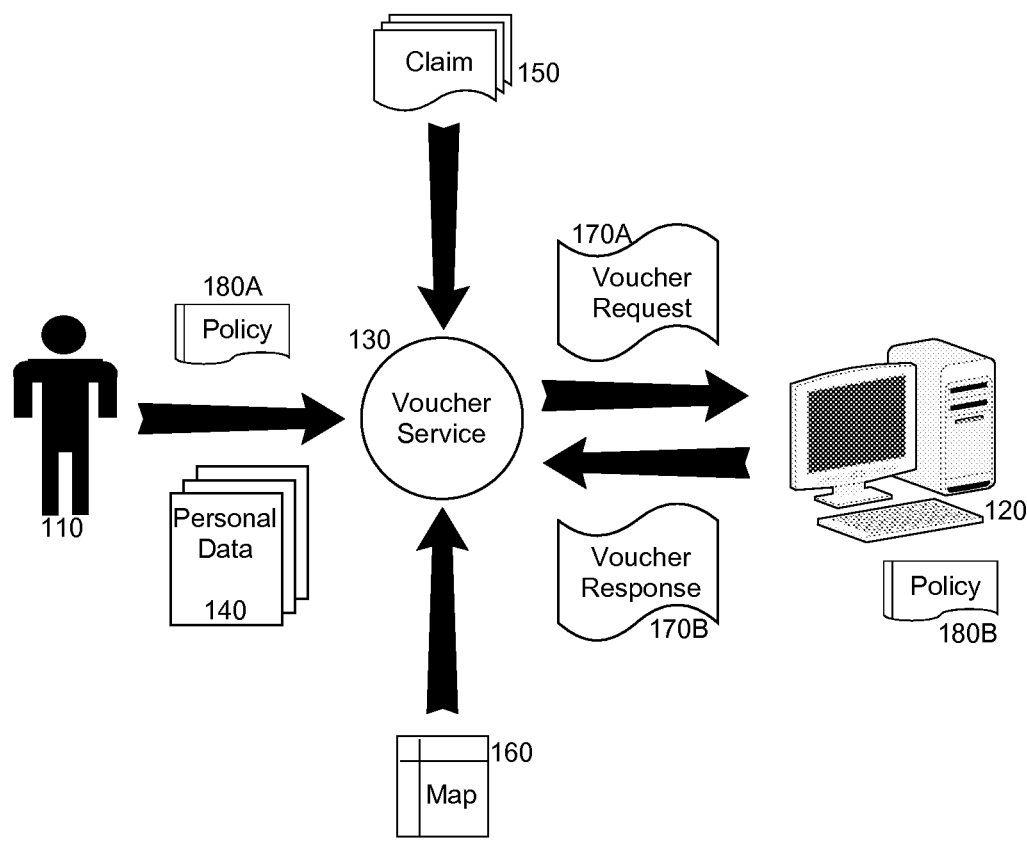
FIG. 1 is a pictorial illustration of a process for trusted statement verification for privacy data management.

In further illustration, FIG. 1 is a pictorial illustration of a process for trusted statement verification for data privacy. As shown in FIG. 1, an intermediate voucher service 130 can be disposed between an end user 110 publisher of personal data 140 and an e-commerce consumer 120 seeking a voucher based upon the personal data 140. To that end, within map 160 attributes of the personal data 140 provided by the end user 110 can be mapped to one or more claims 150 able to be deduced from the personal data 140. Subsequently, voucher requests 170A by the e-commerce consumer 120 can be matched to one or more of the claims 150 and, if the matched ones of the claims 120 meet the requirements of the voucher request 170A, an affirmative voucher response 170B can be provided to the e-commerce consumer 120 without revealing the underlying personal data 140 to the e-commerce consumer 120.

Notably, the transformation of personal data 140 into one or more claims 150 can be driven by a policy 180A specified by the end user 110, for instance in the form of WS-Policy based expressions. The policy can 180A can act as a filter limiting what types of personal data 140 can be transformed into a claim 150. Additionally, the policy 180A can act as a filter limiting or augmenting what types of voucher requests 170A are honored with a response 170B. By comparison, a policy 180B can be specified by the e-commerce consumer 120 to indicate what types of personal data 140 are preferred. The voucher service 130 can process both policies 180A, 180B to limit the matching of a voucher request 170A with the claims 150. For example, the end user 110 can specify a policy to withhold or add salary range data, whereas the e-commerce consumer 120 can specify a policy to request salary range data to better market products or services to the end user 110.

Figure 2:
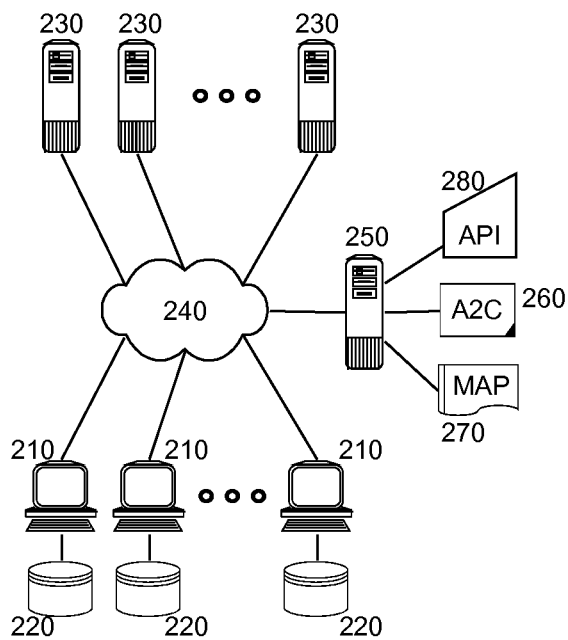
FIG. 2 is a schematic illustration of an e-commerce data processing system configured for trusted statement verification for privacy data management; and, FIG. 3 is a flow chart illustrating a process for trusted statement verification for privacy data management.

The process of trusted statement verification can be performed in an e-commerce data processing system. In this regard, FIG. 2 schematically depicts an e-commerce data processing system configured for trusted statement verification for data privacy. Referring to FIG. 2, one or more end user publishers 210 of private data can be communicatively coupled to a voucher service 250 over computer communications network 240. Each of the end user publishers 210 can include a data store of personal data 220. Additionally, one or more voucher consumers 230 can be communicatively coupled to the voucher service 250 over the computer communications network 240.

The voucher service 250 can include a map 270 of attributes to claims. Specifically, attributes for private data within the data store 120 for each of the end user publishers 210 can be mapped to claims deduced from the attributes. Specifically, one or more attributes can be generalized into a basic statement. For example, the attribute "bank account balance=$100,000.00US" can be deduced into the claim "bank account balance>$25,000.00US". Similarly, the attribute "birth date=01-01-1970" can be deduced into the claim "age>35". As it will be apparent, multiple different claims can be deduced for each attribute or combination of attributes. Additionally, the claims can be generated manually, or in an automated fashion by applying rules in a rules base in an attribute to claims engine 260. An exemplary rule in a rule base would include "for a provided bank balance, identify all required balances supported by the provided balance in increments of $10,000 upwards of $100,000".

An application programming interface (API) 280 to the voucher service 250 can be provided. The API 280 can be exposed to the voucher consumers 230 such that the consumers 230 can issue voucher requests to the voucher service 250. Each of the voucher requests provided by a requesting one of the voucher consumers 230 can be compared to the claims in the map 270 and a voucher response to each of the voucher requests in the form of a secure token can be provided to the requesting one of the voucher consumers 230 where a mapped claim can support the voucher request. For example, a voucher request for "age>40" can be matched to a claim "age>40" or a claim "age>45" and a token can be returned accordingly. Yet, the attribute "birth date=01-01-60" need not be revealed in the token.

Figure 3:
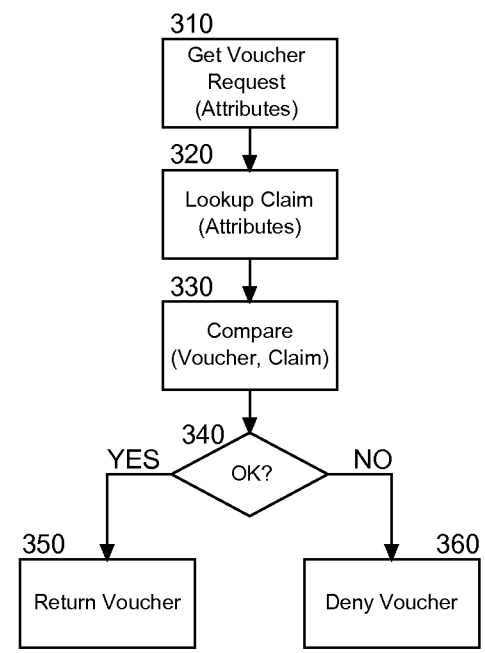

In yet further illustration of the operation of the voucher service 250, FIG. 3 is a flow chart illustrating a process for trusted statement verification for data privacy. Beginning in block 310, a voucher request can be received for an assertion based upon attributes of personal data for a target end user. In block 320, one or more relevant claims can be located that have been mapped to the attributes. Thereafter, in block 330, the voucher request can be compared to each located claim and in decision block 340 it can be determined whether a token can be provided to the requestor vouching for the assertion. If so, in block 350 a voucher can be provided in the form of a token. Otherwise in block 360, the voucher can be denied.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for trusted statement verification for data privacy within a voucher service data processing system communicatively coupled to one or more end users computing devices and one or more voucher consumers computing devices, the method comprising:
deducing, by a processor of a computer in the voucher service data processing system, a claim from an attribute of personal data assigning a specific value to a variable and received from an end user from an end user computing device by locating the claim as having have been mapped to the attribute;
receiving, by the processor of the computer, a request from a voucher consumer computing device issued via an exposed application programming interface over a computer communications network to vouch for an assertion based upon the attribute of personal data, the assertion asserting the variable to have a value of a particular range;
comparing the assertion to the claim to determine whether the specific value is within the particular range; and,
providing a voucher in the form of a secure token over the computer communications network to the voucher consumer computing device for the assertion on behalf of the end user upon determining that the specific value is within the particular range without revealing the specific value to the voucher consumer computing device.

2. The method of claim 1, further comprising:
retrieving a policy for the end user; and,
filtering the claim according to the policy,
wherein the policy limits what types of personal data are transformed into a claim or what types of voucher requests are honored.

3. The method of claim 1, further comprising:
retrieving a policy for the end user; and,
augmenting the claim according to the policy,
wherein the policy augments what types of voucher requests are honored.

4. The method of claim 1, further comprising:
retrieving a policy for the voucher consumer computing device; and,
filtering the claim according to the policy,
wherein the policy indicates what types of personal data are preferred.

5. The method of claim 1, further comprising:
retrieving a policy for the voucher consumer computing device; and,
augmenting the claim according to the policy,
wherein the policy indicates what types of personal data are preferred.

6. A voucher service data processing system for trusted statement verification for data privacy, wherein the voucher service data processing system is communicatively coupled to one or more end users computing devices and one or more voucher consumers computing devices, the system comprising:
a hardware processor configured to perform
deducing a claim from an attribute of personal data assigning a specific value to a variable and received from an end user from an end user computing device by locating the claim as having have been mapped to the attribute;
receiving a request from a voucher consumer computing device issued via an exposed application programming interface over a computer communications network to vouch for an assertion based upon the attribute of personal data, the assertion asserting the variable to have a value of a particular range;
comparing the assertion to the claim to determine whether the specific value is within the particular range; and,
providing a voucher in the form of a secure token over the computer communications network to the voucher consumer computing device for the assertion on behalf of the end user upon determining that the specific value is within the particular range without revealing the specific value to the voucher consumer computing device.

7. The system of claim 6, wherein the assertion is a required bank account balance and the claim is an available bank account balance in excess of a fixed amount.

8. The system of claim 6, wherein the assertion is a required age and the claim is an age range exceeding a fixed amount.

9. A computer program product comprising a non-transitory computer usable storage medium having stored therein computer usable program code for trusted statement verification for data privacy, the computer usable program code, when executed by a computer hardware device, causes the computer hardware device to perform
deducing a claim from an attribute of personal data assigning a specific value to a variable and received from an end user from an end user computing device by locating the claim as having have been mapped to the attribute;

receiving a request from a voucher consumer computing device issued via an exposed application programming interface over a computer communications network to vouch for an assertion based upon the attribute of personal data, the assertion asserting the variable to have a value of a particular range;

comparing the assertion to the claim to determine whether the specific value is within the particular range; and, providing a voucher in the form of a secure token over the computer communications network to the voucher consumer computing device for the assertion on behalf of the end user upon determining that the specific value is within the particular range without revealing the specific value to the voucher consumer computing device.

10. The computer program product of claim 9, further comprising:

retrieving a policy for the end user; and, filtering the claim according to the policy, wherein the policy limits what types of personal data are transformed into a claim or what types of voucher requests are honored.

11. The computer program product of claim 9, further comprising:

retrieving a policy for the end user; and, augmenting the claim according to the policy, wherein the policy augments what types of voucher requests are honored.

12. The computer program product of claim 9, further comprising:

retrieving a policy for the voucher consumer computing device; and, filtering the claim according to the policy, wherein the policy indicates what types of personal data are preferred.

13. The computer program product of claim 9, further comprising:

retrieving a policy for the voucher consumer computing device; and, augmenting the claim according to the policy, wherein the policy indicates what types of personal data are preferred.

* * * * *